US012240091B2

(12) United States Patent
Lin

(10) Patent No.: US 12,240,091 B2
(45) Date of Patent: Mar. 4, 2025

(54) HAMMER STRUCTURE

(71) Applicant: Witman Corporation, Changhua (TW)

(72) Inventor: Hui-Ni Lin, Changhua (TW)

(73) Assignee: Witman Corporation, Changhua (TW)

( * ) Notice: Subject to any disclaimer, the term of this patent is extended or adjusted under 35 U.S.C. 154(b) by 274 days.

(21) Appl. No.: 17/891,239

(22) Filed: Aug. 19, 2022

(65) Prior Publication Data

US 2024/0058932 A1 Feb. 22, 2024

(51) Int. Cl.
*B25D 1/02* (2006.01)

(52) U.S. Cl.
CPC .................................... *B25D 1/02* (2013.01)

(58) Field of Classification Search
CPC ..... B25D 1/02; B25D 2250/105; F16B 41/00; F16B 41/002; F16B 39/04; F16B 39/28; F16B 39/282; F16B 39/30; B25B 23/0007; B25B 23/0035; B25B 23/0042; Y10T 403/602
USPC ....................................... 81/25, 26; 403/327
See application file for complete search history.

(56) References Cited

U.S. PATENT DOCUMENTS 2,893,279 A * 7/1959 Haskell .................... B25D 9/10 173/127
5,105,493 A * 4/1992 Lugtenaar ................ B25G 3/14 7/116
6,289,540 B1 * 9/2001 Emonds ................. A01B 1/225 7/116
6,401,576 B1 * 6/2002 Wu ........................ B25G 1/066 81/177.4

FOREIGN PATENT DOCUMENTS

TW M595566 U * 5/2020 ............. B25B 19/00

* cited by examiner

*Primary Examiner* — Eric J Rosen
*Assistant Examiner* — Aaron R McConnell
(74) *Attorney, Agent, or Firm* — Ying-Ting Chen

(57) ABSTRACT

A hammer structure includes a hammer body, at least one hitting block, a compression spring, and a shaft. The hammer body has a radial through hole. The hitting block includes a mounting portion having an accommodating hole. The compression spring is accommodated in the accommodating hole. The shaft is inserted through the compression spring so that it can be elastically extended and retracted via the compression spring. The mounting portion of the hitting block is screwed to the end of the hammer body. The shaft counteracts an elastic force of the compression spring to be partially engaged in the radial through hole. The hammer structure can prevent the hitting block screwed to a mounting groove of the hammer body from being loosened due to strong impact and vibration in the hitting process, so as to fix the hitting block and avoid damage effectively.

3 Claims, 5 Drawing Sheets

HAMMER STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a hammer structure, and more particularly to a hammer structure having a shaft embedded between a hammer body and a hitting block to prevent the hitting block from being loosened and avoid damage.

Description of Related Arts

FIG. 1 and FIG. 2 illustrate a conventional hammer having a hitting block. The conventional hammer comprises a hammer body 10, a handle 11, and at least one hitting block 12. The handle 11 is connected to one side of the hammer body 10 to form a "T" shape. At least one end of the hammer body 10 is recessed to form a mounting groove 13. The mounting groove 13 has an internal thread segment 14 on an inner peripheral surface thereof. An annular end face 15 is formed between the end of the hammer body 10 and an opening of the mounting groove 13. The hitting block 12 has a hitting portion 16 and a mounting portion 17 protruding from one end of the hitting portion 16. The mounting portion 17 has an outer diameter less than that of the hitting portion 16, so that a stop edge 18 is formed between the end of the hitting portion 16 and the mounting portion 17. The mounting portion 17 has an external thread segment 19 on an outer peripheral surface thereof. The external thread segment 19 of the mounting portion 17 is screwed to the internal thread segment 14 of the mounting groove 13, so that the hitting block 12 is fixed to at least one end of the hammer body 10 and the stop edge 18 abuts against the annular end face 15 of the mounting groove 13 to bear the hitting force. In this way, the hitting portion 16 of the hitting block 12 is used to hit an object to be processed. According to different objects to be hit, the hitting block 12 may be made of a metal, wood or rubber material as required, and can be replaced with ease. However, the hitting block 12 is secured only by engagement of the external thread segment 19 and the internal thread segment 14. In the hitting process, the external thread segment 19 is easily disengaged from the internal thread segment 14 due to strong impact and vibration. As a result, the annular end surface 15 is separated from the stop edge 18. If the user continues using the hammer body 10, the hitting force received by the hitting block 12 cannot be shared via the stop edge 18 and the annular end face 15, but is directly transmitted to the mating surfaces of the external thread segment 19 and the internal thread segment 14. It is conceivable that the outer thread segment 19 and the inner thread segment 14 cannot withstand the strong hitting force and are easily damaged. Therefore, the user needs to pay attention to whether the hitting block 12 is screwed firmly when in use. When the inner thread segment 14 is slightly damaged, even if the hitting block 12 is replaced with a new one, it will be very difficult to lock the hitting block 12 to the end of the hammer body 10. Accordingly, the inventor of the present invention has devoted himself based on his many years of practical experiences to solve these problems.

SUMMARY OF THE PRESENT INVENTION

The primary object of the present invention is to solve the above-mentioned problems and provide a hammer structure. The hammer structure includes a hammer body, at least one hitting block, a compression spring and a shaft. The hammer body has a radial through hole. The hitting block includes a mounting portion having an accommodating hole. The shaft is accommodated in the accommodating hole and can be elastically extended and retracted through the compression spring. The shaft can be partially engaged in the radial through hole to prevent the hitting block from being loosened by wrong rotation. The shaft can be moved out of the radial through hole for replacing the hitting block. The hammer structure provided by the present invention can fix the hitting block and avoid damage effectively.

In order to achieve the foregoing object, the present invention provides a hammer structure, comprising a hammer body, at least one hitting block, a compression spring, and a shaft. At least one end of the hammer body is recessed to form a mounting groove. An annular end face is formed between the end of the hammer body and an opening of the mounting groove. The hammer body has a radial through hole communicating with the mounting groove. The radial through hole has a large-diameter hole section at an inner end thereof and a small-diameter hole section at an outer end thereof. The hitting block has a hitting portion and a mounting portion protruding from one end of the hitting portion. The mounting portion has an outer diameter less than that of the hitting portion. A stop edge is formed between the end of the hitting portion and the mounting portion. The mounting portion has an accommodating hole transversely passing through the mounting portion. The accommodating hole includes an engaging hole, a reduced hole and a positioning hole in sequence. The reduced hole is located inside the accommodating hole. The engaging hole is located at one end of the reduced hole and extends to an outer peripheral surface of the mounting portion. The positioning hole is located at another end of the reduced hole and extends to the outer peripheral surface of the mounting portion. The compression spring is accommodated in the engaging hole. One end of the compression spring abuts against the reduced hole. The shaft has a small-diameter shaft section, a large-diameter shaft section, and a stop face between the small-diameter shaft section and the large-diameter shaft section. The shaft is inserted into the accommodating hole. The small-diameter shaft section of the shaft passes through the compression spring. The stop face presses against another end of the compression spring. The shaft counteracts an elastic force of the compression spring for a distal end of the small-diameter shaft section to pass through the reduced hole and extend into the positioning hole. The large-diameter shaft section is in the engaging hole. A C-shaped retaining ring is provided to fasten the distal end of the small-diameter shaft section. The C-shaped retaining ring is blocked by the reduced hole to prevent the small-diameter shaft section from coming out of the positioning hole. When the large-diameter shaft section is pressed in the accommodating hole, the external thread segment of the mounting portion is screwed to the internal thread segment of the mounting groove, so that the stop edge abuts against the annular end face of the mounting groove, and the large-diameter shaft section is pushed by the compression spring to extend out of the outer peripheral surface of the mounting portion to be engaged in the large-diameter hole section of the radial through hole.

In an embodiment of the present invention, the small-diameter hole section has a diameter less than that of the large-diameter shaft section.

In an embodiment of the present invention, the mounting groove has an internal thread segment on an inner peripheral surface thereof, the mounting portion has an external thread segment on an outer peripheral surface thereof, and the external thread segment of the mounting portion is screwed to the internal thread segment of the mounting groove.

The above structure can prevent the hitting block screwed to the mounting groove from being loosened due to strong impact and vibration in the hitting process, so as to fix the hitting block and avoid damage effectively.

DETAILED DESCRIPTION OF THE PREFERRED EMBODIMENT

Embodiments of the present invention will now be described, by way of example only, with reference to the accompanying drawings.

Figure 1:
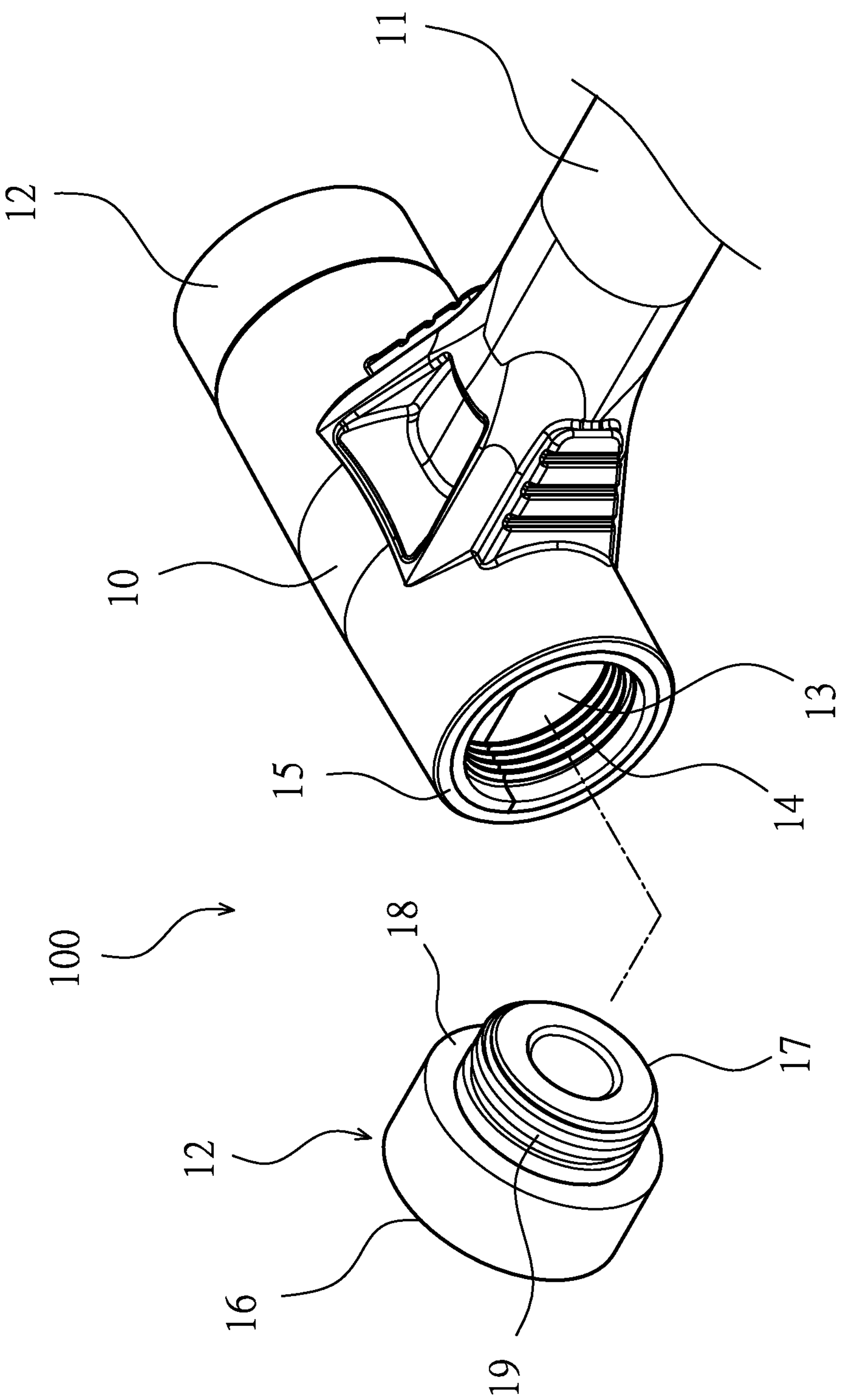
FIG.1 PRIOR ART
FIG. 1 is a perspective view of the prior art.
Figure 2:
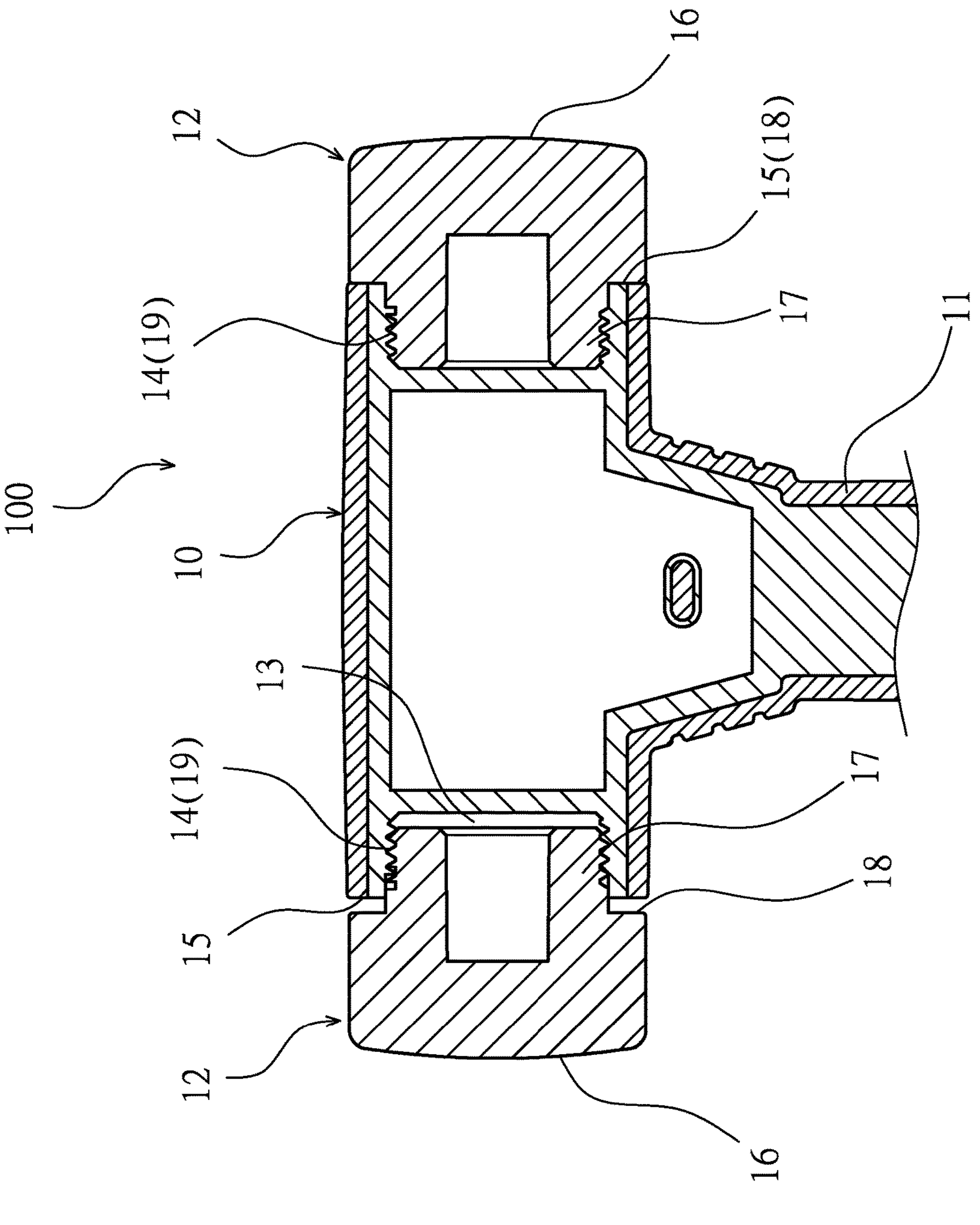
FIG. 2 PRIOR ART
FIG. 2 is a front cross-sectional view of the prior art.
Figure 3:
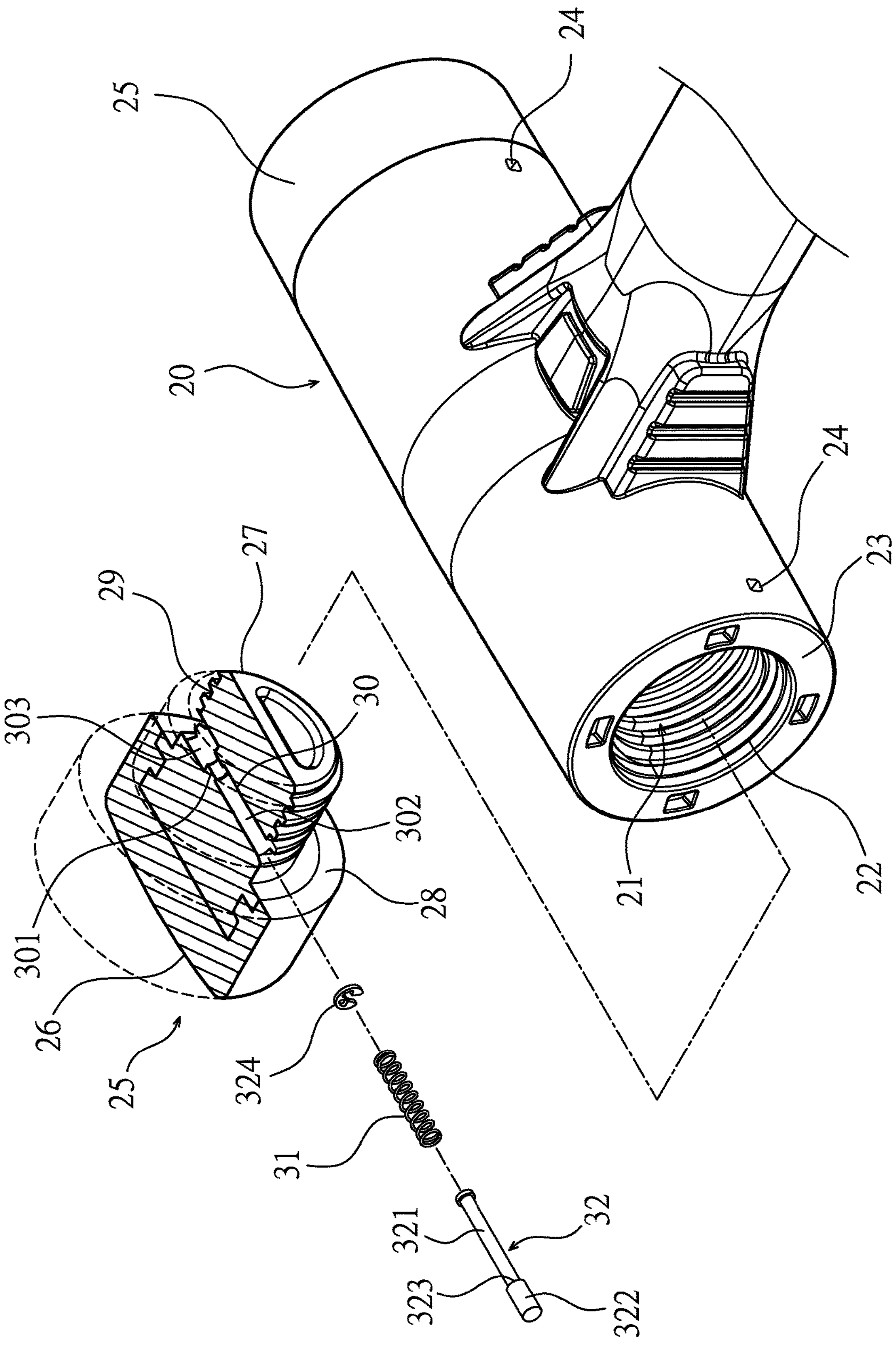
FIG. 3 is an exploded view of the present invention.
Figure 4:
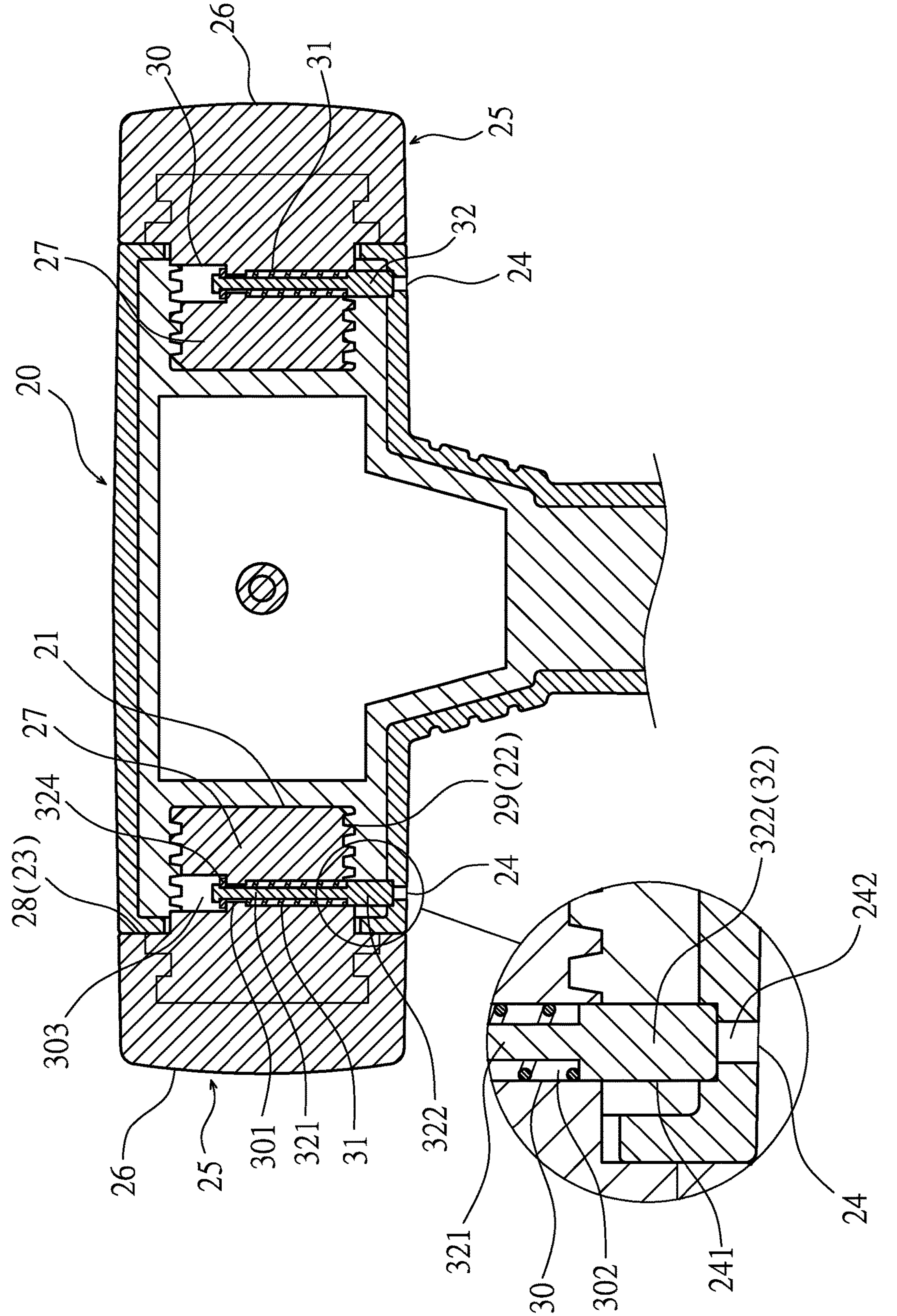
FIG. 4 is a front cross-sectional of the present invention.
Figure 5:
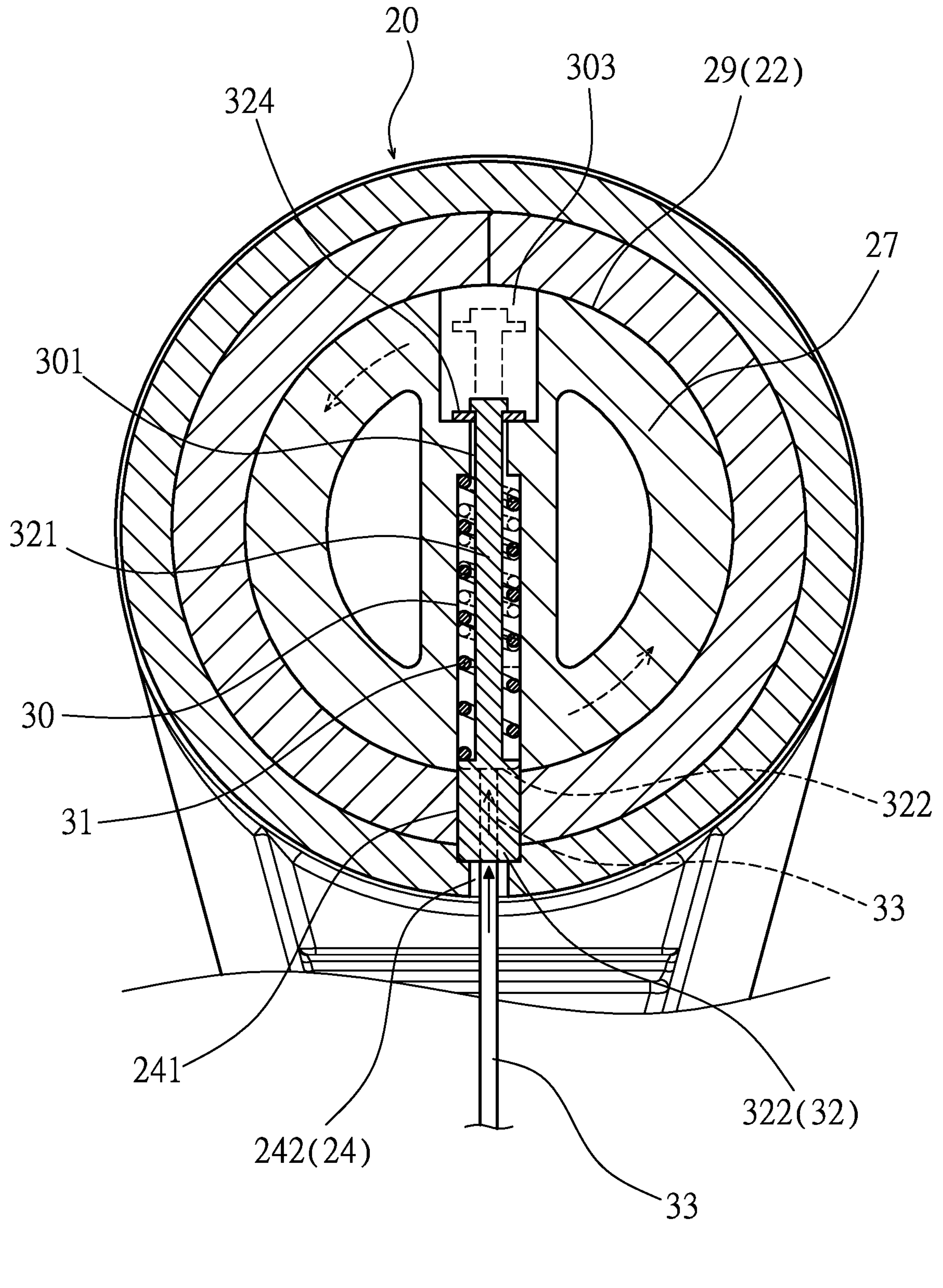
FIG. 5 is a side cross-sectional of the present invention.

Referring to FIGS. 3 to 5, the present invention comprises a hammer body 20, at least one hitting block 25, a compression spring 31, and a shaft 32.

At least one end of the hammer body 20 is recessed to form a mounting groove 21. The mounting groove 21 has an internal thread segment 22 on an inner peripheral surface thereof. An annular end face 23 is formed between the end of the hammer body 20 and an opening of the mounting groove 21. The hammer body 20 has a radial through hole 24 communicating with the mounting groove 21. The radial through hole 24 has a large-diameter hole section 241 at an inner end thereof and a small-diameter hole section 242 at an outer end thereof. The hitting block 25 has a hitting portion 26 and a mounting portion 27 protruding from one end of the hitting portion 26. The mounting portion 27 has an outer diameter less than that of the hitting portion 26, so that a stop edge 28 is formed between the end of the hitting portion 26 and the mounting portion 27. The mounting portion 27 has an external thread segment 29 on an outer peripheral surface thereof and an accommodating hole 30 transversely passing through the mounting portion 27. The accommodating hole includes an engaging hole 302, a reduced hole 301, and a positioning hole 303 in sequence. The reduced hole 301 is located inside the accommodating hole 30. The engaging hole 302 is located at one end of the reduced hole 301 and extends to the outer peripheral surface of the mounting portion 27. The positioning hole 303 is located at another end of the reduced hole 301 and extends to the outer peripheral surface of the mounting portion 27. The compression spring 31 is accommodated in the engaging hole 302. One end of the compression spring 31 abuts against the reduced hole 301. The shaft 32 has a small-diameter shaft section 321, a large-diameter shaft section 322, and a stop face 323 between the small-diameter shaft section 321 and the large-diameter shaft section 322. The shaft 32 is inserted into the accommodating hole 30, and the small-diameter shaft section 321 of the shaft 32 passes through the compression spring 31, so that the stop face 323 presses against the other end of the compression spring 31. An external force is applied to the shaft 32 against the elastic force of the compression spring 31 for the distal end of the small-diameter shaft section 321 to pass through the reduced hole 301 and extend into the positioning hole 303. The large-diameter shaft section 322 is in the engaging hole 302, and a C-shaped retaining ring 324 is configured to fasten the distal end of the small-diameter shaft section 321. The C-shaped retaining ring 324 is blocked by the reduced hole 301 to prevent the small-diameter shaft section 321 from coming out of the accommodating hole 30. When the large-diameter shaft section 322 is pressed into the accommodating hole 30, the external thread segment 29 of the mounting portion 27 is screwed to the internal thread segment 22 of the mounting groove 21, so that the stop edge 28 abuts against the annular end face 23 of the mounting groove 21. At this time, the large-diameter shaft section 322 is pushed by the compression spring 31 to extend out of the outer peripheral surface of the mounting portion 27 and to be engaged in the large-diameter hole section 241 of the radial through hole 24. The above structure can prevent the hitting block 25 screwed to the mounting groove 21 from being loosened due to strong impact and vibration in the hitting process, so as to fix the hitting block 25 and avoid damage effectively.

The assembly, function and effect of the above-mentioned embodiment are described in detail below. Referring to FIGS. 3 to 5, when the hitting block 25 of the present invention is to be assembled, a force is applied to the large-diameter shaft section 322 of the shaft 32 extending out of the outer peripheral surface of the mounting portion 27. The stop face 323 of the shaft 32 compresses the compression spring 31, so that the large-diameter shaft section 322 is moved into the engaging hole 302. At this time, the shaft 32 is in the accommodating hole 30 and won't hinder the hitting block 25 from being screwed to the mounting groove 21. When the hitting block 25 is rotated until the stop edge 28 abuts against the annular end face 23 of the mounting groove 21, the accommodating hole 30 is just aligned with the radial through hole 24. The shaft 32 is pushed by the compression spring 31, so that the large-diameter shaft section 322 of the shaft 32 is moved in the large-diameter hole section 241 of the radial through hole 24. The diameter of the small-diameter hole section 242 of the radial through hole 24 is less than the diameter of the large-diameter shaft section 322 of the shaft 32, which can prevent the shaft 32 from coming out of the radial through hole 24. At this time, the shaft 32 is positioned between the radial through hole 24 and the accommodating hole 30. In this way, the hitting block 25 cannot be rotated relative to the hammer body 20. In other words, the hitting block 25 won't be disengaged from the mounting groove 21, which can avoid the problem that the mating surfaces of the internal thread segment 22 and the external thread segment 29 are directly damaged by the hitting force. As shown in FIG. 5, when the hitting block 25 needs to be replaced, a rod tool 33 is used to pass through the small-diameter hole section 242 of the radial through hole 24 and exert a force on the large-diameter shaft section 322 of the shaft 32 to compress the compression spring 31. The large-diameter shaft section 322 of the shaft 32 is moved away from the large-diameter hole section 241 of the radial through hole 24 to be in the engaging hole 302 of the accommodating hole 30, so that the hitting block 25 can be rotated reversely to disengage from the mounting groove 21 for replacement.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hammer structure, comprising a hammer body, at least one hitting block, a compression spring, and a shaft; at least one end of the hammer body being recessed to form a mounting groove, an annular end face being formed between the end of the hammer body and an opening of the mounting groove, the hammer body having a radial through hole communicating with the mounting groove, the radial through hole having a large-diameter hole section at an inner end thereof and a small-diameter hole section at an outer end thereof; the hitting block having a hitting portion and a mounting portion protruding from one end of the hitting portion, the mounting portion having an outer diameter less than that of the hitting portion, a stop edge being formed between the end of the hitting portion and the mounting portion, the mounting portion having an accommodating hole transversely passing through the mounting portion, the accommodating hole including an engaging hole, a reduced hole and a positioning hole in sequence; the reduced hole being located inside the accommodating hole, the engaging hole being located at one end of the reduced hole and extending to an outer peripheral surface of the mounting portion, the positioning hole being located at another end of the reduced hole and extending to the outer peripheral surface of the mounting portion; the compression spring being accommodated in the engaging hole, one end of the compression spring abutting against the reduced hole;

the shaft having a small-diameter shaft section, a large-diameter shaft section and a stop face between the small-diameter shaft section and the large-diameter shaft section, the shaft being inserted into the accommodating hole, the small-diameter shaft section of the shaft passing through the compression spring, the stop face pressing against another end of the compression spring; the shaft counteracting an elastic force of the compression spring for a distal end of the small-diameter shaft section to pass through the reduced hole and extend into the positioning hole, the large-diameter shaft section being in the engaging hole, a C-shaped retaining ring being provided to fasten the distal end of the small-diameter shaft section, the C-shaped retaining ring being blocked by the reduced hole to prevent the small-diameter shaft section from coming out of the positioning hole, wherein when the large-diameter shaft section is pressed into the accommodating hole, an external thread segment of the mounting portion is screwed to an internal thread segment of the mounting groove, so that the stop edge abuts against the annular end face of the mounting groove, and the large-diameter shaft section is pushed by the compression spring to extend out of the outer peripheral surface of the mounting portion to be engaged in the large-diameter hole section of the radial through hole.

2. The hammer structure as claimed in claim 1, wherein the small-diameter hole section has a diameter less than that of the large-diameter shaft section.

3. The hammer structure as claimed in claim 1, wherein the mounting groove has the internal thread segment on an inner peripheral surface thereof, the mounting portion has the external thread segment on an outer peripheral surface thereof, and the external thread segment of the mounting portion is screwed to the internal thread segment of the mounting groove.

* * * * *